(12) United States Patent
Gravelle et al.

(10) Patent No.: US 6,382,645 B1
(45) Date of Patent: May 7, 2002

(54) OFFSET UPPER STRUT MOUNT

(75) Inventors: Stephen M. Gravelle, Elk River; Bruce L. Currey, Minnetonka, both of MN (US)

(73) Assignee: Northstar Manufacturing Co., Inc., Minnetonka, MN (US)

( * ) Notice: Subject to any disclaimer, the term of this patent is extended or adjusted under 35 U.S.C. 154(b) by 0 days.

(21) Appl. No.: 09/729,504

(22) Filed: Dec. 4, 2000

(51) Int. Cl.⁷ .............................................. B62D 17/00
(52) U.S. Cl. ........................ 280/86.754; 280/86.752; 280/124.147; 280/124.155
(58) Field of Search ............... 280/124.147, 124.146, 280/124.145, 124.151, 124.154, 124.155, 86.75, 86.751, 86.752, 86.754, FOR 112

(56) References Cited

U.S. PATENT DOCUMENTS

| | | |
|---|---|---|
| 4,084,837 A | 4/1978 | Milner |
| 4,200,307 A | 4/1980 | Szabo |
| 4,213,631 A | 7/1980 | Wilkerson |
| 4,372,575 A | 2/1983 | Hyma |
| 4,711,463 A | 12/1987 | Knable et al. |
| 4,817,984 A | 4/1989 | Ferman et al. |
| 4,867,473 A | 9/1989 | Jordan |
| 4,909,642 A | 3/1990 | Hoermandinger |
| 4,946,188 A | 8/1990 | Key et al. |
| 5,158,269 A | 10/1992 | Hein et al. |
| 5,338,055 A | 8/1994 | Mauz |
| 5,484,161 A | 1/1996 | McIntyre |
| 5,788,262 A | 8/1998 | Dazy et al. |
| 5,947,459 A | 9/1999 | Ducloux et al. |

*Primary Examiner*—Eric Culbreth
(74) *Attorney, Agent, or Firm*—Haugen Law Firm PLLP

(57) ABSTRACT

An adjustment offset conical mount for use in combination with motor vehicles equipped with conically shaped strut mount towers formed in the chassis of the vehicle. The offset mount is rotatably and adjustably received within the tower and the arcuate position of the offset mount relocates the strut and its associated wheel assembly to a correct position within the vehicle and particularly within vehicular chassis. Camber and caster parameters are correctable, with camber ranges from at least +1.5° and −0.75° being achieved, while caster correction is available between +−1.12°.

2 Claims, 4 Drawing Sheets

OFFSET UPPER STRUT MOUNT

BACKGROUND OF THE INVENTION

The present invention relates generally to an improved strut mounting member for use in combination with a motor vehicle having a vehicular chassis and a wheel suspension mechanism including a collapsible strut member. Such suspension mechanisms and/or assemblies are in widespread use, and are utilized by a number of motor vehicle and automotive manufacturers in the United States as well as in other countries. The device of the present invention is designed for use in correcting and/or adjusting certain wheel alignment parameters including simultaneous readjustment of camber and/or caster. The present invention is designed for use as an adjustable attachment between the upper strut and the conical strut tower formed within the vehicular chassis.

In typical motor vehicle assembly, a portion of the vehicle wheel suspension mechanism is coupled to the chassis through a collapsible strut member, such as, for example, McPherson type strut. These struts typically comprise a central body with upper chassis coupling and lower wheel assembly coupling ends, with a load bearing coil spring being arranged coaxially about the strut. The coil spring creates a responsive and load-supporting force between the chassis and the wheel suspension mechanism and is commonly found in motor vehicles.

In normal usage, motor vehicles occasionally strike obstructions such as curbs, gutters, other vehicles, and the like and the suspensions may suffer some damage. Additionally, the normal wear and tear on the suspension systems causes the suspension mechanism to lose or shift from specified alignment parameters. In vehicles equipped with strut suspension systems, camber is a parameter which frequently requires readjustment.

The motor vehicles, as manufactured, are equipped with upper strut mounting assemblies which generally lack even limited alignment adjustment features. As such, even moderate or other unusual impacts with curbs, gutters, and/or other vehicles can lead to misalignment from proper and specified alignment parameters. The present invention provides a straightforward and expedient arrangement which may be employed in connection with motor vehicles equipped with strut suspension systems and having vehicular chassis with a conical strut receiving or attachment tower formed therein. Such assemblies are typically found in certain front-wheel drive vehicles such as Ford Focus and Mercury Mystique and Cougar models manufactured from 1995 through at least 2001. Similar systems may also be found in certain rear wheel suspension assemblies as well.

SUMMARY OF THE INVENTION

In accordance with the present invention, an improved adjustable offset conical mount is provided which is designed to be received snugly within the conically shaped tower formed in the chassis structure of an automobile. The offset mount is designed to be rotatably and adjustably received within the tower, with its arcuate position relocating the strut and its associated wheel assembly relative to the vehicular chassis. This device provides for correction of camber within a range of from at least +1.5° and −0.75°, while providing for caster correction in the range of between +1.12° and −1.12°. The improved offset conical strut mount accordingly provides a means for receiving and adjustably positionably coupling the distal end of the chassis coupling end of the strut to the conical strut tower of the vehicle chassis.

The upper strut mount body member comprises upper and lower offset portions, with each body portion having a generally conical configuration. The upper and lower body portions are spaced apart by a separator plate having a bore extending therethrough, with the bore being positioned centrally of the lower portion and eccentrically of the upper portion. The upper body portion, in turn, has the conical outer wall covered with a resilient pad, preferably with a scalloped outer surface. This combination is, in turn, received within and mated with the vehicular chassis tower, while providing adjustable repositioning of the upper strut end within the chassis tower.

The lower body portion has an axis parallel to and offset from the axis of the upper body portion, and preferably has a conical outer wall with an open bottom chamber formed therein. The lower body portion has a flanged base with an annular thrust bearing retaining skirt extending downwardly therefrom. An annular thrust bearing is received within the skirt and retains the spring seat within the inner circumference, thereby enabling relative rotational movement to occur between the strut assembly and the offset conical mount.

With its eccentric bore, adjustment of at least one vehicular wheel alignment parameter selected from camber and/or caster is accomplished through selective adjustable rotatable positioning of the mount body within the conical strut tower so as to achieve the desired angular position.

These features of the present invention facilitate a relatively straightforward alignment adjustment, particularly relating to camber and/or caster, with a minimum number of new components being required, along with a reduction in the time requirements for the conventional realignment steps.

Therefore, it is a primary object of the present invention to provide an improved apparatus for adjustment of wheel alignment parameters of a motor vehicle, particularly those equipped with a collapsible strut coupled to the chassis at a chassis strut tower.

It is a further object of the present invention to provide an improved wheel alignment adjustment assembly which is readily interposed between the chassis and the wheel suspension mechanism of a motor vehicle, and with the adjustment assembly incorporating an offset upper strut mount body member adjustably positionable within the conical strut tower of the vehicle chassis.

Other and further objects of the present invention will become apparent to those skilled in the art upon a study of the following specification, appended claims, and accompanying drawings.

IN THE DRAWINGS

Figure 10:
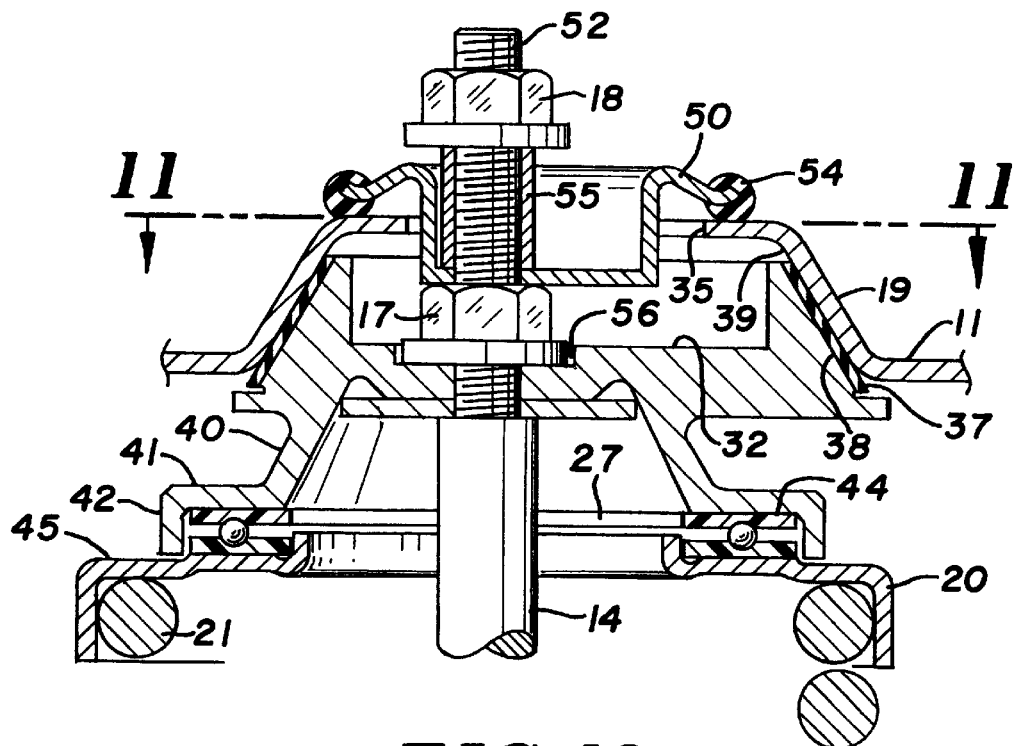
Figure 11:
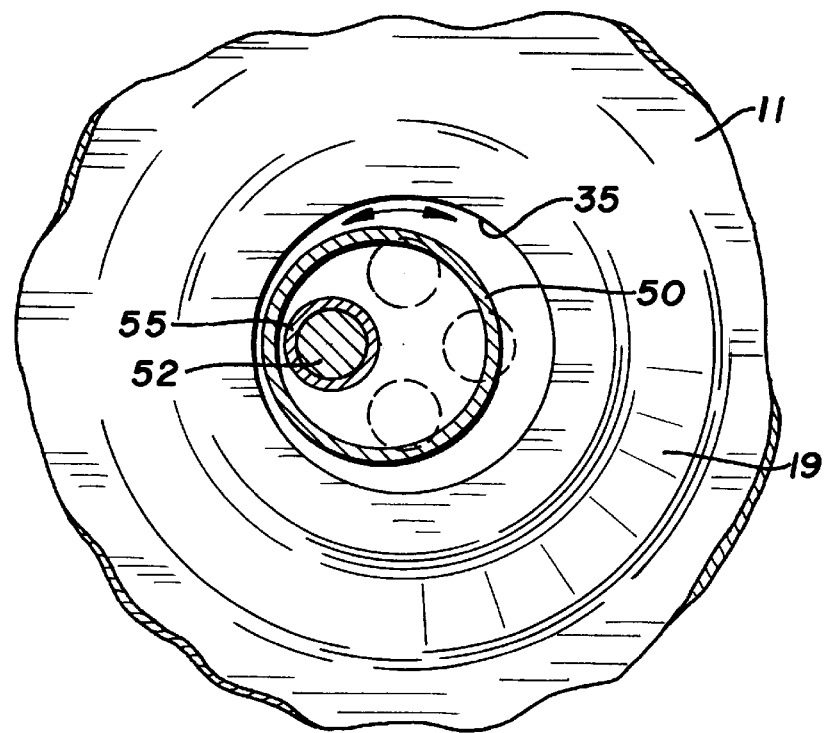

FIG. 10 is a vertical sectional view taken through the diameter of the offset conical mount assembly in place in a chassis tower, and illustrating the detail of the coupling of the strut shaft to the offset conical mount assembly, and also the configuration of the coil spring within the spring seat; and FIG. 11 is a horizontal sectional view taken along the line and in the direction of the arrows 11—11 of FIG. 10.

DESCRIPTION OF THE PREFERRED EMBODIMENT

Figures 1, 2:
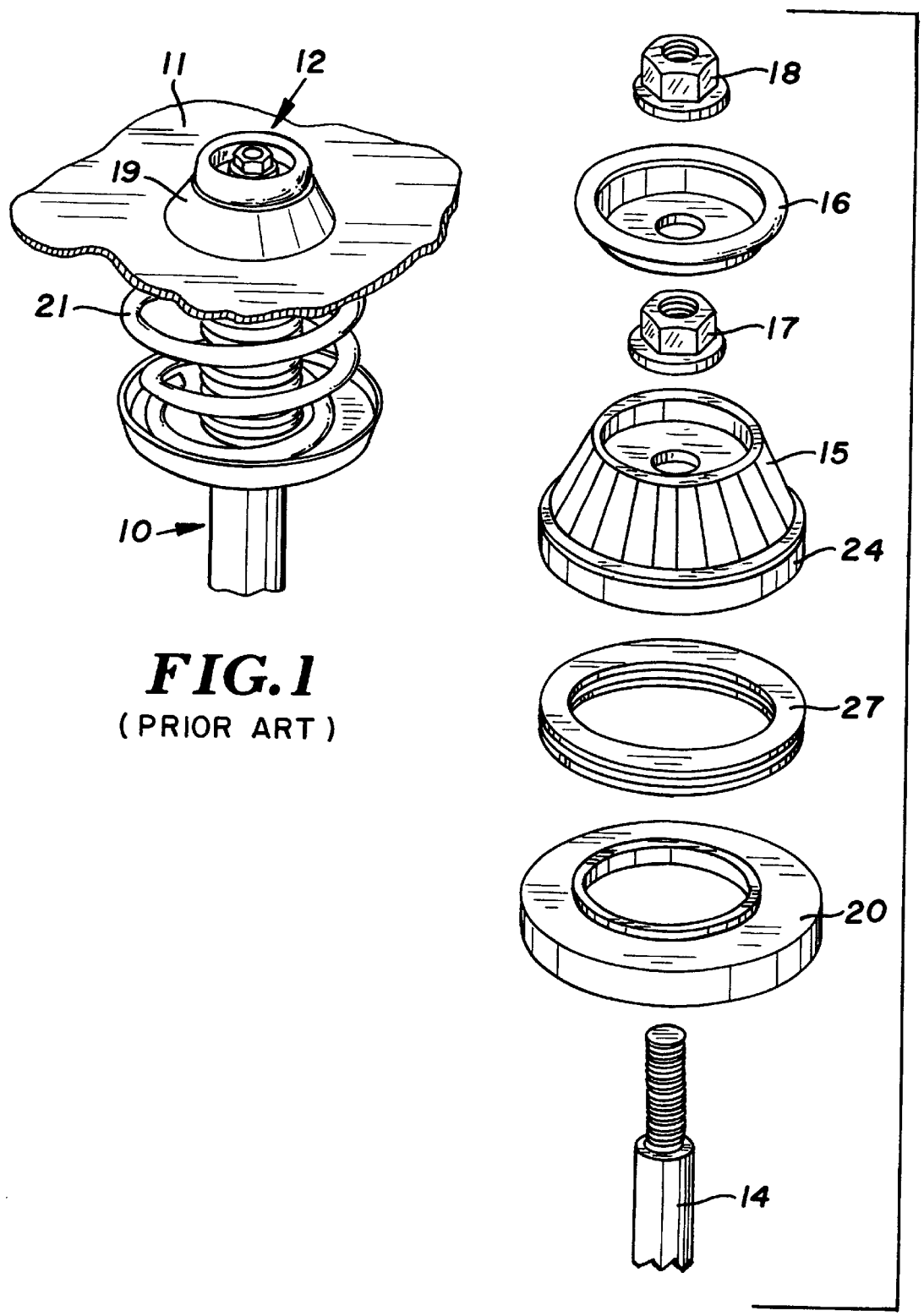
FIG. 1 is a fragmentary perspective view of a standard prior art equipped concentric strut mount assembly, and illustrating a cut-away or fragmentary portion of the vehicle chassis structure.
FIG. 2 is an exploded perspective view of the components illustrated in FIG. 1, with the chassis structure being removed.
Figure 4:
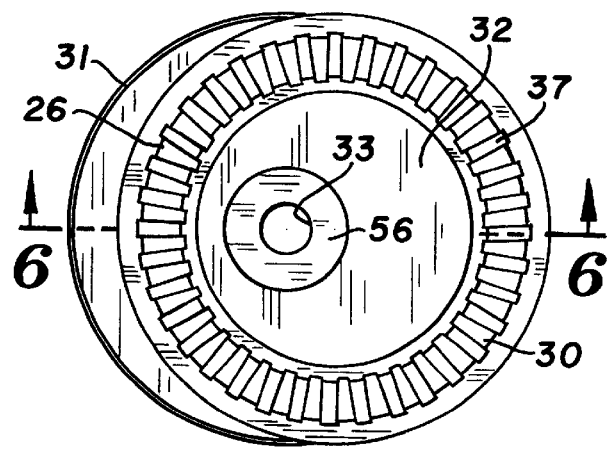
FIG. 4 is a top plan view of the offset conical mount of the present invention.
Figure 5:
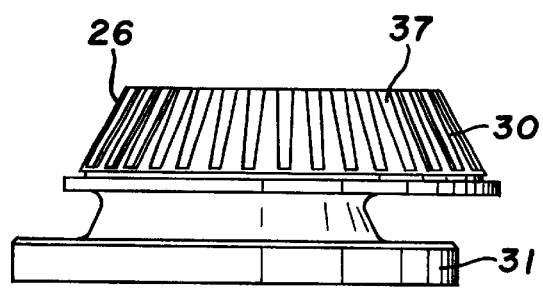
FIG. 5 is a side view of the mount illustrated in FIG. 4.
Figure 6:
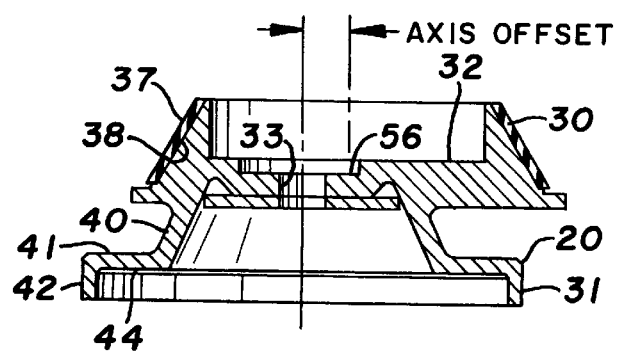
FIG. 6 is a sectional view taken along the line and in the direction of arrow 6—6 of FIG. 4.

In accordance with the preferred embodiment of the present invention, and with particular attention being directed to the prior art devices shown in FIGS. 1 and 2, the strut assembly generally designated 10 is coupled to the vehicular chassis structure 11 through the strut mounting assembly generally designated 12. In this connection, the upper distal end 14 of strut 10 is coupled to chassis 11 through conical mount 15 through rubber covered cup washer 16 with appropriate fasteners such as inner and outer flange nuts 17 and 18. Briefly, inner nut 17 secures the upper distal end 14 of the strut 10 to spring mount 15, with outer nut 18 serving to engage strut shaft 14 and to clampingly engage rubber covered cup washer 16 with the annular surface of conical shaped tower 19 formed in chassis 11.

The disadvantages of the prior art structure include a lack of adjustment capability, thus requiring extensive realignment operations and procedures to take place with the vehicle in order to reposition the wheel assembly to the chassis so as to restore alignment parameters.

As further indicated in FIGS. 1 and 2 upper spring seat 20 is utilized to coupled coil spring 21 to the overall assembly, with thrust bearing 27 being utilized to permit relative rotation between spring seat 20 and offset conical mount 15. As will become apparent hereinafter, thrust bearing 27 is seated within the skirt portion 24 of offset conical spring mount 15, and accommodates the relative motion between spring seat 20 and offset mount 24 as indicated hereinabove.

Figure 3:
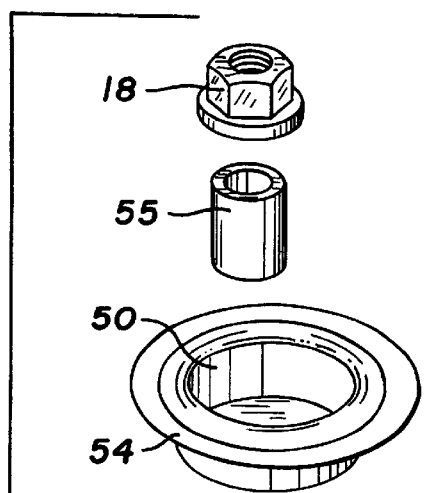
FIG. 3 is a exploded perspective view similar to FIG. 2 but illustrating the improved offset mount assembly of the present invention.
Figure 3:
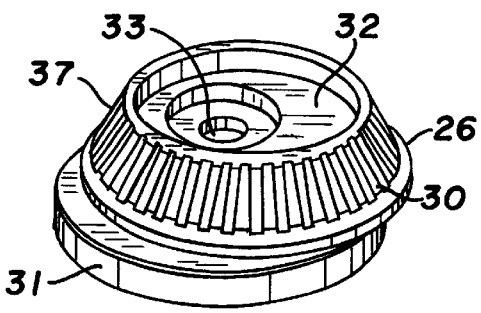
Figure 3:
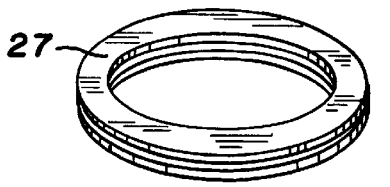
Figure 3:
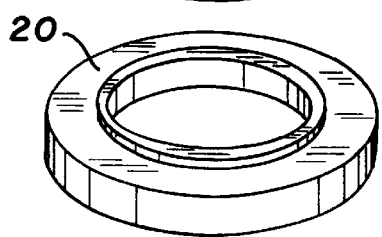
Figure 3:
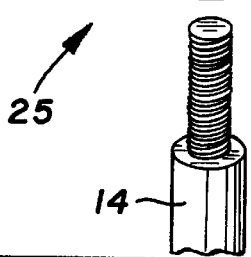

With attention now being directed to FIG. 3 of the drawings, it will be noted that those components of the device of FIG. 3 which are also present in the arrangement of prior art assemblies of FIGS. 1 and 2 will be referred to by the same reference numeral. In this connection, assembly 25 is utilized to couple upper distal end of strut shaft 14 to the conical shaped tower in the chassis, as shown at 11 in FIG. 1. Assembly 25 includes an offset conical 26 which is provided with a flanged portion to receive thrust bearing 27. As indicated, the wheel suspension mechanism of the vehicle (not shown) includes a collapsible strut member such as a McPherson strut, the upper distal shaft end being shown at 14 in FIG. 3. This strut member comprises a central body with strut shaft 14 serving as an upper chassis coupling member, with the lower end of the collapsible strut being coupled to a conventional wheel suspension mechanism. The load bearing coil spring is shown at 21 (FIG. 1) with this spring being arranged coaxially about the body of the McPherson strut, the coil spring thereby creating a responsive load bearing force between the chassis and the wheel suspension mechanism. The offset conical spring mount assembly including offset conical mount body 26 is interposed between the chassis (at the conical strut tower) and the wheel suspension mechanism. Positionable coupling of the upper end of strut member 14 within the chassis conical strut tower provides and facilitates correction and restoration of camber and/or caster within the vehicle.

With attention now being directed to FIGS. 3–6, it will be observed that offset upper conical mount 26 comprises upper and lower offset portions 30 and 31 each of generally conical configuration, and spaced apart by separator plate 32. Separator plate 32 has a bore formed therein as at 33, with this bore being disposed centrally or axially of lower body portion 31, and eccentrically of upper body portion 30.

Upper body 30 has a central axis with a conical outer wall arranged to be received within and mate with the inner conical wall of chassis tower 19, with chassis tower 19, in turn, having an open top as at 35 (FIG. 10). A resilient pad having a scalloped outer wall surface 37 is secured to the outer surface 38 of body portion 30, with this surface, in turn being designed to mate with the inner surface 39 of tower 19.

With continued attention being directed to FIGS. 3–6 and with further attention being directed to FIG. 10, it will be seen that lower body portion 31 has an axis parallel to an axis of the upper chamber due to the offset, with body portion 31 further having an outer conical wall as at 40. Lower body portion is further provided with a flanged bearing receiving foot 41, with skirt 42 extending downwardly. As illustrated in FIG. 10, a shouldered seat is thereby provided for thrust bearing 27, with bearing 27, in turn, being interposed between flange surface 44 and the upper surface 45 of spring seat 20.

Figure 7:
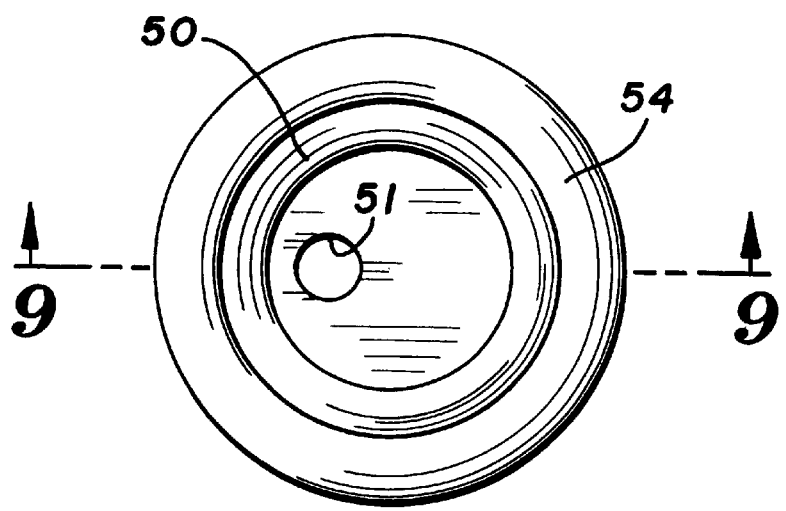
FIGS. 7 and 8 are top plan and side views of the rubber covered cup washer utilized in the assembly of the strut mounting system of the present invention.
Figure 8:
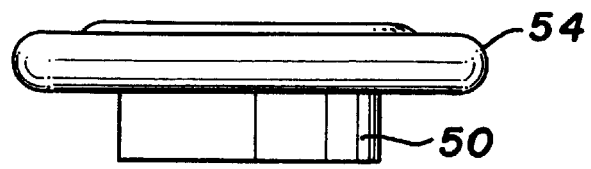
Figure 9:
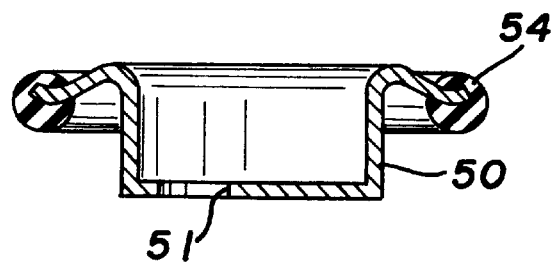
FIG. 9 is a vertical sectional view taken along and through the diameter of the rubber covered cup washer of FIGS. 7 and 8, and being taken along the line and in the direction of arrows 9—9 of FIG. 7.

Cup washer retainer member 50 is arranged to be received in and disposed along the top surface of the conical strut tower, with cup washer 50 having an eccentric bore form therein as at 51 (FIG. 7). Bore 51 is arranged to have a radial offset equivalent to that of bore 33, and thus receives upper tip portion 52 of strut shaft 14. Cup washer 50 is provided with a resilient rubber ring 54, with rubber ring 54 being in the form of a closed torroidal ring serving as a resilient shock and vibration isolating pad.

Inner flanged nut 17 is designed to fit in counter bore zone 56 of bore 33 to positionably retain and stabilize strut shaft 14, and to firmly couple strut shaft 14 to offset conical mount 26. Upper flanged nut 18 is, in turn, utilized to firmly secure and couple the outer tip end 52 of strut 14 directly to the vehicle chassis through cup washer 50 and resilient torroidal isolation ring 54. For those applications where the offset would cause interference between the interior of cup washer 50 and flanged nut 18, a spacer sleeve 55 may be interposed in order to provide the appropriate clearance for the flange edge of flanged nut 18.

The arrangement provides for the distal end of the upper end of strut shaft 14 to extend through bore 33, with cup washer 50 serving a clamping function. The arrangement is such that adjustment of at least vehicular wheel alignment parameter, camber and/or caster, is accomplished through selected adjustable rotatable positioning of offset conical tower mount 26 within vehicular conical strut tower 19. Bore 33 provides for shaft 14 to be positionably placed along an axis spaced from the axis of the upper body portion, and at a desired angular position relative to the axis of the vehicular conical strut tower, in order to achieve positional readjustment of the upper end of the strut member and its wheel suspension mechanism relative the chassis running axis.

Of course, it will be appreciated that the examples given herein are for purposes of illustration only, and are not to be construed as a limitation upon the scope of the present invention.

What is claimed is:

1. In combination with a motor vehicle having a vehicular chassis with a conical strut tower formed therein and a wheel suspension mechanism including a collapsible strut member comprising a central body with upper chassis coupling and lower wheel assembly coupling ends and with a load bearing coil spring arranged coaxially about said collapsible strut member for creating a responsive load bearing force between said chassis and said wheel suspension mechanism; a wheel alignment adjustment assembly interposed between said chassis and said wheel suspension mechanism and comprising an upper strut mount assembly for receiving and adjustably positionably coupling said upper chassis coupling end within the conical strut tower of the vehicle chassis with said upper strut mount assembly comprising:

(a) an offset upper strut mount body member comprising upper and lower offset portions of generally conical configuration, the portions being spaced apart by a separator plate having a bore extending therethrough disposed centrally of said lower portion and eccentrically of said upper portion;

(b) said upper body portion having a central axis with a conical outer wall surface arranged to be received within and mate with said chassis tower and having an open top chamber formed therein;

(c) a resilient pad having a scalloped outer surface secured to said conical outer wall and designed to mate with said chassis tower;

(d) said lower body portion having an axis parallel to and offset from the axis of said upper chamber and having a conical outer wall, an open bottom chamber formed in said lower body portion and with said lower body portion having a counter-bore defining an annular coil spring retaining skirt extending axially downwardly from said lower body portion;

(e) a cup washer retainer arranged to be disposed along the top surface of said conical strut tower, said cup washer having an eccentric bore formed therein coaxially with the eccentric bore of the upper portion, said cup washer retainer further having an outer peripheral edge with a closed annular torroidal ring formed of resilient material;

(f) said upper chassis coupling end having a distal tip end, with said distal end being arranged to extend through the bore of said separator wall and said cup washer and to be fastened directly to said separator wall and to said cup washer retainer;

(g) the arrangement being such that at least one of camber and caster adjustment is accomplished through selected adjustable rotatable positioning of said upper strut mount body member within said conical strut tower along an axis spaced from the axis of the upper body portion and at a desired angular position relative to the axis of said conical strut tower for achieving positionable adjustment of the upper end of said collapsible strut member relative to said vehicular chassis.

2. The adjustment assembly system of claim 1 wherein camber corrections range up to +1.5° and −0.75° and caster corrections up to 1.2°.

* * * * *